United States Patent [19]

Satou et al.

[11] Patent Number: 5,159,471
[45] Date of Patent: Oct. 27, 1992

[54] SCANNER DEVICE HAVING A BINARY SIGNAL DEPENDING UPON DENSITY LEVEL OF ADJACENT PIXELS

[75] Inventors: Tatsuya Satou, Nagoya; Masaaki Terazawa, Ichinomiya; Kazuhiro Kuwabara, Tokoname, all of Japan

[73] Assignee: Brother Kogyo Kabushiki Kaisha, Nagoya, Japan

[21] Appl. No.: 559,267

[22] Filed: Jul. 27, 1990

[30] Foreign Application Priority Data

Jul. 27, 1989 [JP] Japan .................................. 1-196301
Sep. 22, 1989 [JP] Japan .................................. 1-247379

[51] Int. Cl.⁵ .............................................. H04N 1/40
[52] U.S. Cl. .................................... 358/466; 358/465; 358/261.3
[58] Field of Search ................... 358/465, 466, 261.3; 382/50, 53, 47

[56] References Cited

U.S. PATENT DOCUMENTS

| 4,473,847 | 9/1984 | Kurata | 358/466 |
| 4,626,922 | 12/1986 | Saitoh | 358/466 |
| 4,791,678 | 12/1988 | Iwase et al. | 358/447 |
| 4,856,075 | 8/1989 | Smith | 382/50 |
| 4,864,392 | 9/1989 | Sato | 358/447 |

Primary Examiner—Edward L. Coles, Sr.
Assistant Examiner—Thomas L. Stoll
Attorney, Agent, or Firm—Oliff & Berridge

[57] ABSTRACT

A scanner device can be used in a facsimile machine or the like for reading a document on line basis. Each line of the document is read on pixel basis while irradiating a light onto the document. The scanner device includes an image sensor which receives a light reflected from the document and converts the light to an analog electrical signal. A controller controls the reading operation of the image sensor. A comparator translates the analog electric signal into a binary signal. The binary signal is stored in a shift register wherein the contents therein represents an image of a preceding line with respect to the present line being read by the image sensor. A threshold value applied to the comparator to read the present line image is varied depending upon the preceding line data stored in the shift register. As such, images on the document can be read with excellent fidelity, particularly when a fine line extending in a main scanning direction is present on the document.

6 Claims, 15 Drawing Sheets

W: WHITE
B: BLACK

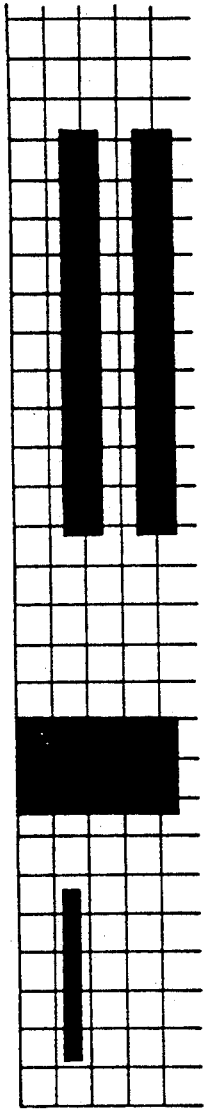
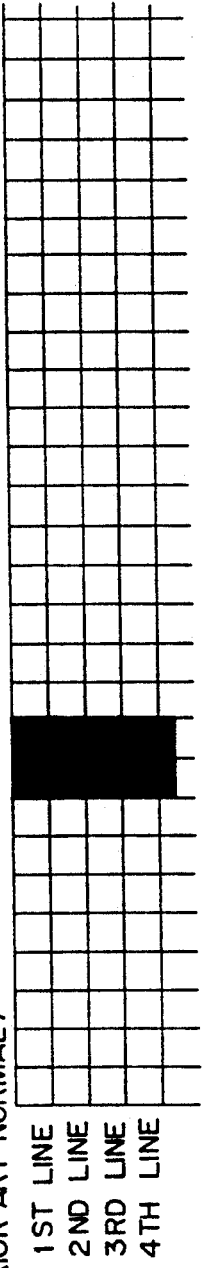
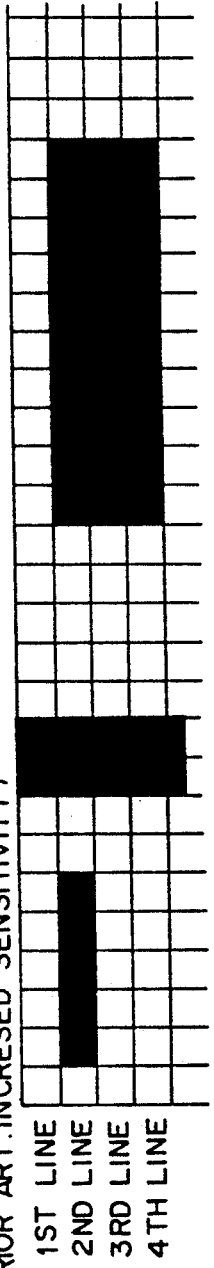
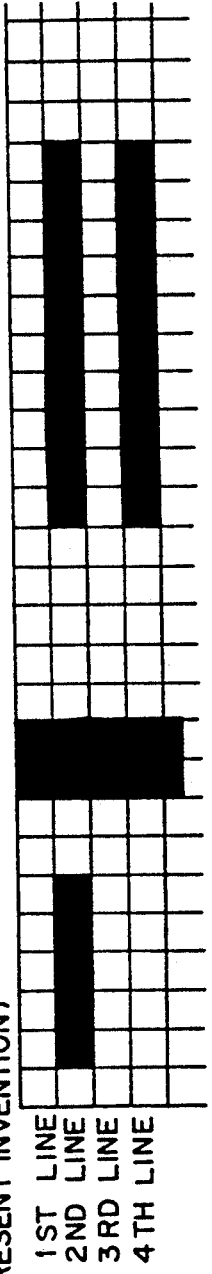
FIG. 6A (DOCUMENT)
FIG. 6B (PRIOR ART NORMAL)
FIG. 6C (PRIOR ART: INCRESED SENSITIVITY)
FIG. 6D (PRESENT INVENTION)

FIG. 14

| THRESHOLD VALUE | RDATA | | LDATA | |
|---|---|---|---|---|
| | LOWER SIGNIFICANT | UPPER SIGNIFICANT | LOWER SIGNIFICANT | UPPER SIGNIFICANT |
| — A — | 0 | 0 | 0 | 0 |
| | 1 | 0 | 1 | 0 |
| — B — | | | | |
| | 0 | 1 | 0 | 1 |
| — C — | | | | |
| | 1 | 1 | 1 | 1 |

FIG. 16

DATA DECISION

| | | | PRECEDING LINE DATA | | | | |
|---|---|---|---|---|---|---|---|
| | | | 0 | 0 | 1 | 1 | UPPER SIGNIFICANT |
| | | | 0 | 1 | 0 | 1 | LOWER SIGNIFICANT |
| RDATA | 0 | 0 | 0 | 0 | 0 | 0 | |
| | 1 | 0 | 1 | 0 | 0 | 0 | |
| | 0 | 1 | 1 | 1 | 1 | 0 | |
| | 1 | 1 | 1 | 1 | 1 | 1 | |
| | LOWER SIGNIFICANT | UPPER SIGNIFICANT | RESULTANT DATA | | | | |

FIG. 15

| RDATA | | LDATA | | RESULTS OF PROCESSING | |
|---|---|---|---|---|---|
| LOWER SIGNIFICANT | UPPER SIGNIFICANT | LOWER SIGNIFICANT | UPPER SIGNIFICANT | LOWER SIGNIFICANT | UPPER SIGNIFICANT |
| 0 | 0 | 0 | 0 | 0 | 0 |
| 1 | 0 | 0 | 0 | 0 | 0 |
| 0 | 1 | 0 | 0 | 1 | 0 |
| 1 | 1 | 0 | 0 | 1 | 0 |
| 0 | 0 | 1 | 0 | 0 | 0 |
| 1 | 0 | 1 | 0 | 1 | 0 |
| 0 | 1 | 1 | 0 | 1 | 0 |
| 1 | 1 | 1 | 0 | 0 | 1 |
| 0 | 0 | 0 | 1 | 1 | 0 |
| 1 | 0 | 0 | 1 | 1 | 0 |
| 0 | 1 | 0 | 1 | 0 | 1 |
| 1 | 1 | 0 | 1 | 0 | 1 |
| 0 | 0 | 1 | 1 | 1 | 0 |
| 1 | 0 | 1 | 1 | 0 | 1 |
| 0 | 1 | 1 | 1 | 0 | 1 |
| 1 | 1 | 1 | 1 | 1 | 1 |

SCANNER DEVICE HAVING A BINARY SIGNAL DEPENDING UPON DENSITY LEVEL OF ADJACENT PIXELS

BACKGROUND OF THE INVENTION

The present invention relates generally to a scanner device for use in a facsimile machine or the like. The scanner device reads a document containing text, graphics, photograph, etc.

When a document is read out with a scanner device or a reading device, it is sometimes difficult to read a fine line extending in a main scanning direction (hereinafter referred to as "horizontal fine line"). Such a difficulty occurs because the horizontal fine line may not be perceived by the scanner device. When the level of the picked up image raises above and falls below a threshold as the document is scanned, the line will be reproduced in undulated fashion rather than straightly extending in the horizontal direction. It has been a common practice to reproduce the horizontal fine line in a fine resolution mode in which the number of scanning lines per a unit length in the auxiliary scanning direction is increased when the document is scanned.

The fine resolution mode is, however, disadvantageous in that it takes a long time in reading the document and it is inconvenient when a large amount of data is transmitted due to slowness of the scanning speed. If it is intended to read the horizontal fine line at a normal resolution mode in which the document is read at a normal speed with increased sensitivity, the resolution is further degraded and some of the details are lost in the reproduced image.

SUMMARY OF THE INVENTION

The present invention has been made to solve the above problems, and it is an object of the invention to provide a scanner device enabling to read a horizontal fine line on a document without lowering a resolution under normal resolution mode, wherein at the time of reading the present line, the threshold value is varied depending upon binary data regarding the preceding line.

Another object of the present invention is to provide a scanner device wherein a plurality of threshold values are selectively used to translate an analog image signal picked up by an image sensor depending upon the level of the preceding line data.

According to one aspect of the present invention, there is provided a scanner device for reading a document wherein the document is read on line basis and a line of the document is read on pixel basis while irradiating a light onto the document, comprising an image sensor for reading an image on a document, the image sensor receiving a light reflected from the document and converting the light received therefrom to an analog electric signal, control means for controlling the reading operation of the image sensor, a comparator for translating the analog electric signal into a binary signal, the comparator having a first input terminal receiving the analog electric signal and a second input terminal, means for producing a variable threshold value applied to the second input terminal of the comparator, storage means for storing the binary signal representative of an image of a preceding line with respect to a present line which is presently read by the image sensor, and wherein the threshold value applied to the second input terminal of the comparator and used to read the present line is varied depending upon the binary signal stored in the storage means.

In the scanner device thus arranged, when the n-th dot (pixel) on the present line is to be read, the threshold value applied to the comparator varies within a predetermined range depending upon the contents of the binary data regarding the n-th dot of the preceding line. Then, in the comparator, the level of the analog electric signal outputted from the image sensor is compared with the varied threshold value to thereby obtain a binary signal for the n-th dot of the present line. Further, the binary signal thus obtained is stored in the storage means for use in the subsequent translation of the n-th dot of the following line.

According to another aspect of the present invention, there is provided a scanner device for reading a document wherein the document is read on line basis and a line of the document is read on pixel basis while irradiating a light onto the document, comprising an image sensor for reading an image on a document, the image sensor receiving a light reflected from the document and converting the light received therefrom to an analog electric signal, a first comparator for translating the analog electric signal into a binary signal, the first comparator having a first input terminal to which the analog electric signal is applied, a second input terminal to which a first threshold value is applied, and an output terminal, the first comparator outputting a first binary signal upon comparing the analog electric signal with the first threshold value, a second comparator for translating the analog electric signal into a binary signal, the second comparator having a first input terminal to which the analog electric signal is applied, a second input terminal to which a second threshold value is applied, and an output terminal, the first threshold value being larger than the second threshold value, the second comparator outputting a second binary signal upon comparing the analog electric signal with the second threshold value, processing means having two input terminals connected respectively to the output terminals of the first and second comparators, the processing means processing the first and second binary signals to detect whether the analog electrical signal outputted from the image sensor has a level falling within a range between the first and second threshold values and outputting detection data, storage means for storing the detection data regarding a preceding line with respect to a present line which is presently read by the image sensor, and selection means receiving the first and second binary signals from the first and second comparators, the selection means selecting either one of the first and second binary signals in response to the detection data supplied from the storage means.

In the scanner device thus arranged, the analog electric signal outputted from the image sensor is compared with the first and second threshold values in the first and second comparators, respectively, and the processing means detects whether the level of the analog electrical signal falls within an intermediate range defined by the first and second threshold values. The resultant detection data is stored in the storage means. The selection means selects either one of the first and second binary signals fed from the first and second comparator depending upon the detection data stored in the storage means which data represents the previous line data.

According to still another aspect of the present invention, there is provided a scanner device for reading a document wherein the document is read on line basis and a line of the document is read on pixel basis while irradiating a light onto the document, comprising an image sensor for reading an image on a document, the image sensor receiving a light reflected from the document and converting the light received therefrom to an analog electric signal, a first comparator for translating the analog electric signal into a binary signal, the first comparator having a first input terminal to which the analog electric signal is applied, a second input terminal to which a first threshold value is applied, and an output terminal, the first comparator outputting a first binary signal upon comparing the analog electric signal with the first threshold value, a second comparator for translating the analog electric signal into a binary signal, the second comparator having a first input terminal to which the analog electric signal is applied, a second input terminal to which a second threshold value is applied, and an output terminal, the first threshold value being larger than the second threshold value, the second comparator outputting a second binary signal upon comparing the analog electric signal with the second threshold value, first storage means for storing the first binary signal regarding a preceding line with respect to a present line which is presently read by the image sensor, selection means receiving the first and second binary signals from the first and second comparators, the selection means selecting either one of the first and second binary signals, second storage means for storing data regarding one pixel contained in the selected binary signal, and processing means for producing a selection signal based on the first binary signal stored in the first storage means and the data stored in the second storage means, the selection means selecting either one of the first and second binary signal in response to the detection signal to provide a binary signal representative of an image of the present line.

The analog electric signal outputted from the image sensor is, on one hand, compared with the first threshold value which is larger than the second threshold value, and the resultant first binary signal is stored in the first storage means. One of the first and second binary signals outputted from the first and second comparators is selected by the selection means and data regarding one pixel contained in the selected binary signal is stored in the second storage means. With respect to the line which is presently read by the image sensor, the first binary signal stored in the first storage means represents the preceding line data and the data stored in the second storage means represents the preceding dot data on the present line. The binary signal regarding the present dot on the present line is determined depending upon the first and second binary signals, and the data stored in the first and second storage means.

According to further aspect of the present invention, there is provided a scanner device for reading a document wherein the document is read on line basis and a line of the document is read on pixel basis while irradiating a light onto the document, comprising an image sensor for reading an image on a document, the image sensor receiving a light reflected from the document and converting the light received therefrom to an analog electric signal, a plurality of comparators, each having a first input terminal to which the analog electrical signal is applied, a second input terminal to which applied is a threshold value different from those of the remaining comparators, and an output terminal, each of the plurality of comparators outputting a binary signal upon comparing the analog electrical signal with its own threshold value, processing means connected to the output terminals of the plurality of comparators for processing a plurality of binary signals outputted therefrom to provide multi-bit data representative of densities of a predetermined number of pixels on a line which is presently read by the image sensor, storage means for storing data supplied from the processing means for an amount corresponding to one line on the document, and selection means for selecting one of the binary signals outputted from the plurality of comparators based on the data stored in the storage means.

The analog electric signal outputted from the image sensor is compared with each of the plurality of threshold values, and the data regarding the density of each dot on the present line is represented with the multi-bit and such data covering one line is stored in the storage means. The binary signal on the present line is determined depending upon the data stored in the storage means.

The above and other objects, features and advantages of the present invention will become more apparent from the following description when taken in conjunction with the accompanying drawings in which preferred embodiments of the present invention are shown by way of illustrative examples.

BRIEF DESCRIPTION OF THE DRAWINGS

FIGS. 6A through 6D are diagrams showing a document to be read out, images reproduced according to a conventional scanner device, and images reproduced according to the first embodiment of the present invention;

FIGS. 14 through 16 are tables for description of the processing and data decision implemented by the scanner device according to the fourth embodiment of the present invention.

DETAILED DESCRIPTION OF THE PREFERRED EMBODIMENTS

A first embodiment of the present invention will be described with reference to FIGS. 1, 2 and 3.

Figure 1:
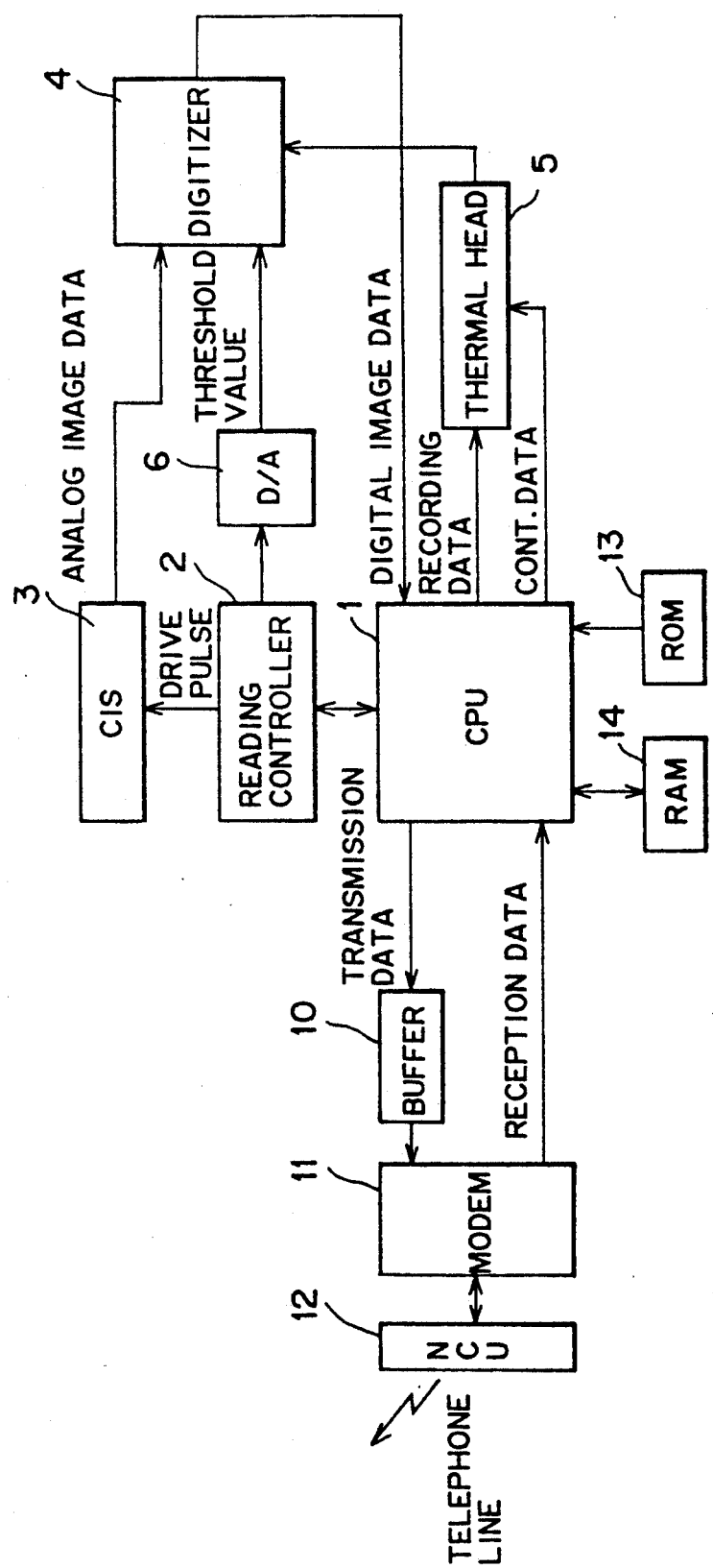
FIG. 1 is a block diagram showing an electrical connection of a facsimile machine according to a first embodiment of the present invention.

FIG. 1 shows in block form an electrical connection of a facsimile machine. The facsimile machine includes a microcomputer (hereinafter referred to as "CPU") 1 which issues instructions for controlling operations of the facsimile machine, a reading controller 2 for controlling reading operations in response to the instruction issued therefrom, an image sensor (hereinafter referred to as "CIS") 3 for picking up text or image on a document to be transmitted and outputting analog image data in response to drive pulses fed from the reading controller 2. The facsimile machine further includes a digitizer 4 for translating the analog image data into digital image data, a thermal head 5 incorporating a shift register therein having one line image data storing capability, and a D/A converter 6 which receives a digital signal from the reading controller 2 and outputting an analog threshold value used for digitizing the analog image data. The digital image data outputted from the digitizer 4 is applied to the shift register within the thermal head 5 through the CPU 1 and one line image data is stored therein. When the image on the present line is being read and translated into binary signals, the preceding line image data is being held in the shift register in a binary format. The thermal head 5 is used for image reproduction.

Data used as a basis for the analog threshold value is inputted to the D/A converter 6 from the reading controller 2. Transmission data is outputted from the CPU 1 in binary format and is applied through a buffer 10 to a modem 11 where the transmission data is converted to analog data so that the latter is sent to another facsimile machine via a telephone line from a network control unit (NCU) 12. Conversely, reception data in analog form is received at the NCU 12 and is inputted to the CPU 1 through the modem 11 where the reception data is converted to digital data. The CPU 1 has a ROM 13 and a RAM 14 both serving as storage devices.

Figure 2:
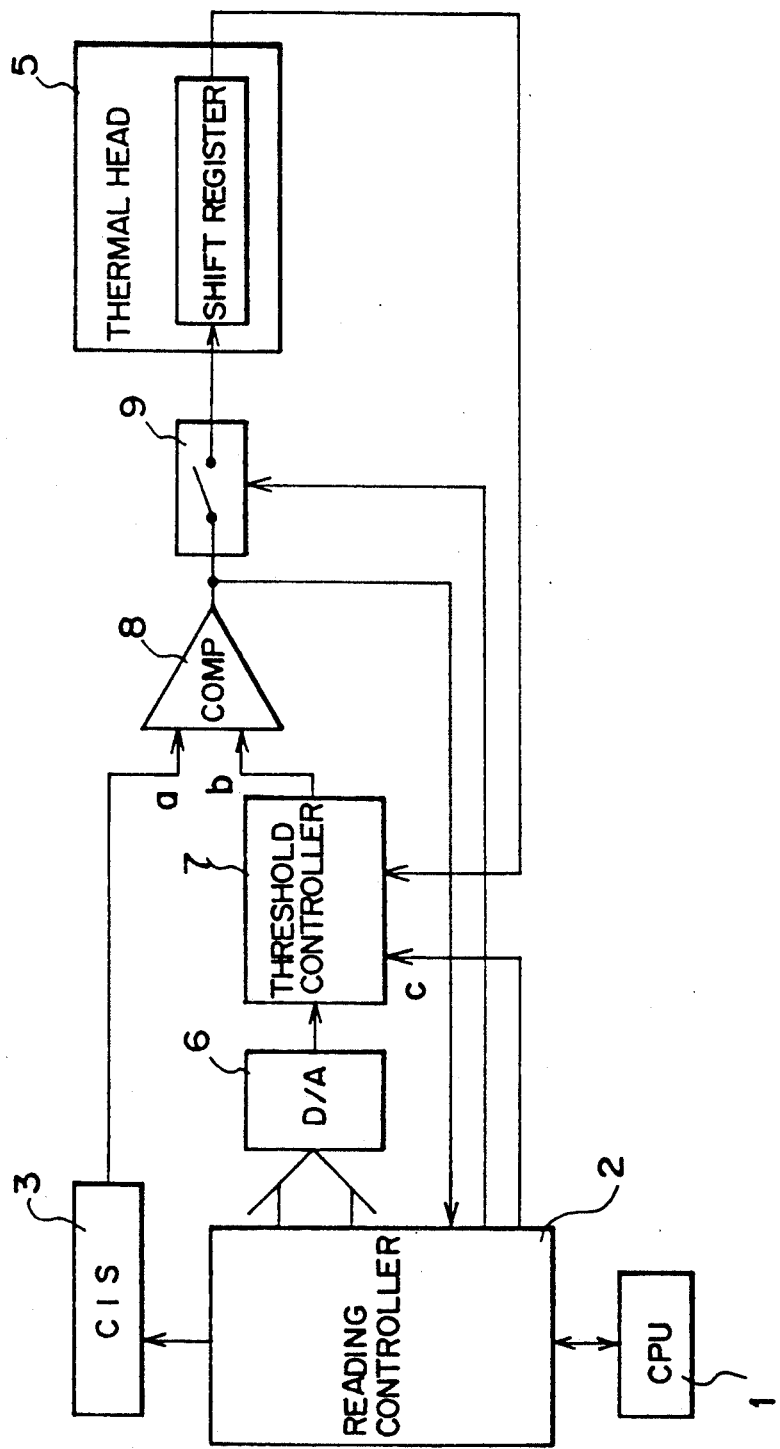
FIG. 2 is a block diagram showing a scanner device incorporated into the facsimile machine of the first embodiment of the present invention.

As shown in FIG. 2 depicted in block form, the digitizer 4 includes a threshold controller 7 and a comparator 8. The threshold controller 7 determines a new threshold value based on both the analog threshold value fed from the D/A converter 6 and the recorded data supplied from the shift register. The comparator 8 has one input terminal connected to the CIS 3 and receives the analog image data a therefrom. The comparator 8 has another input terminal connected to the threshold controller 7 and receives an output b therefrom. A switch 9 is connected between the output terminal of the comparator 8 and the input terminal of the thermal head 5, and the CPU 1 is imposed with the function of the switch 9.

Figure 3:
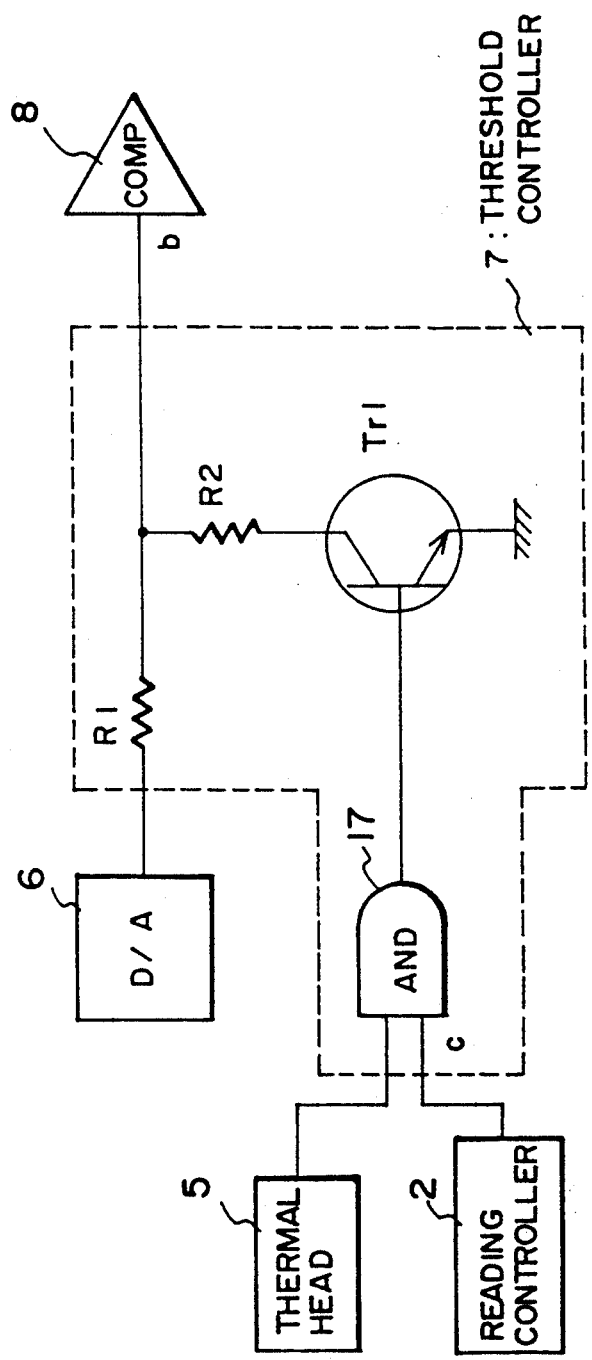
FIG. 3 is a block diagram showing a threshold controller incorporated into the scanner device according to the first embodiment of the present invention.

An example of the threshold controller 7 is shown in FIG. 3. The controller 7 includes an AND gate 17 for ANDing the preceding line recorded data (white: 0, black: 1) fed from the shift register with a threshold control signal c fed from the reading controller 2, a transistor Tr1 which performs ON-OFF switchings in response to the output from the AND gate 17, and resistors R1 and R2 which voltage-divide the output from the D/A converter 6 and determine the level of the input b applied to the comparator 8. The threshold value supplied from the D/A converter 6 is subjected to voltage-division with the co-efficient of $R2/(R1+R2)$ when the transistor Tr1 is ON and the preceding line image data is black ("1"), so that the threshold value is reduced. On the other hand, when the preceding line image data is white ("0"), the transistor Tr1 is rendered OFF with the result that the output from the D/A converter 6 is not subjected to voltage division and the threshold value remains at a high level. When the threshold value control is not to be performed, for example, when the facsimile machine is in fine resolution mode, the signal c is rendered "0", so that the output of the D/A converter 6 can be applied to the input of the comparator 8 without voltage-division.

Referring back to FIG. 2, the switch 9 is provided to latch the preceding line image data in the thermal head 5. The switch 9 is opened when vacant reading (in which the reading operation is performed but no data is available) is carried out for the purpose of time adjustment between the facsimile communication and the reading operation. Specifically, when the vacant reading is carried out, the switch 9 is closed to thereby interrupt the output of the comparator 8 from being applied to the thermal head 5.

Figure 4A:
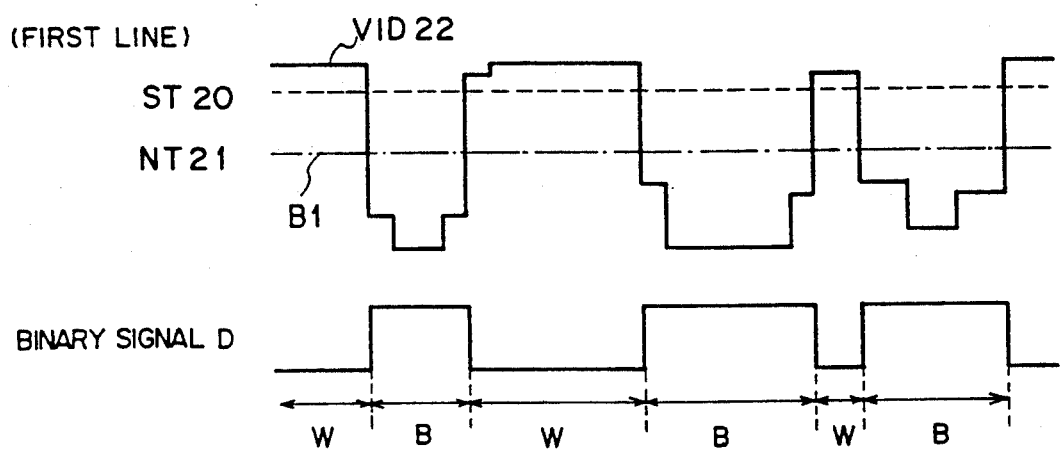
FIGS. 4A and 4B are waveform diagrams for description of reading operations of the scanner device according to the first embodiment of the present invention.
Figure 4B:
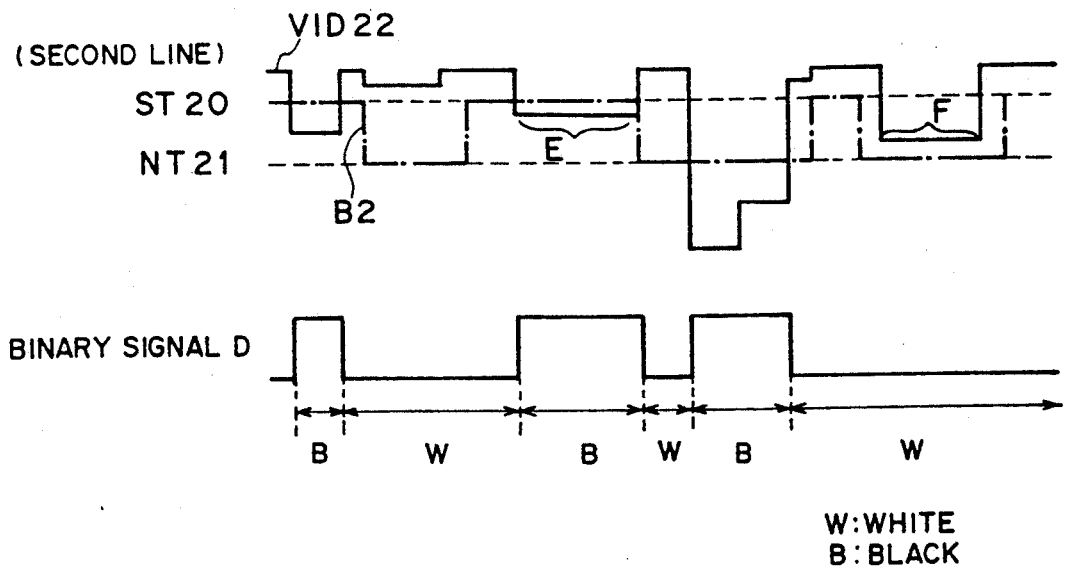

Next, referring to the diagrams shown in FIGS. 4A and 4B, the operation of the first embodiment will be described. In FIGS. 4A and 4B, ST20 and NT 21 represent high and low output levels, respectively, of the threshold controller 7, wherein ST20 is a threshold value capable of reading a horizontal fine line and NT21 is a threshold value set in a conventional normal resolution mode. Either of ST20 or NT21 is selected. VID22 represents analog image data picked up by the CIS3. One-dotted-chain lines B1 and B2 represent selected and set threshold values, i.e., the input b. FIG. 4A illustrates the reading operation of the first line and FIG. 4B illustrates the reading operation of the second line. The level of NT 21 is set to a value wherein the transistor Tr1 shown in FIG. 3 is ON and the threshold value from the D/A converter 6 is voltage-divided by the resistors R1 and R2 whereas the level of ST20 is set to a value wherein the transistor Tr1 is OFF and thus the threshold value from the D/A converter 6 is not voltage-divided. In this embodiment, the analog image data is normally digitized with the level of ST20. However, when the preceding line data obtained from the thermal head 5, i.e., the preceding dot existing in the auxiliary scanning direction with respect to the dot presently being read, represents black or 1, the analog image data is digitized with the level of NT21. Insofar as the first line image data is concerned, it is always digitized with the threshold value B1 equal to the level of NT21.

If, when reading the first line, the output from CIS 3 is such as represented by VID22 in FIG. 4A, the binary image signal D as shown is obtained. As a result, the threshold value applied to the second line fluctuates as shown by one-dotted-chain line B2. If the output from CIS 3 for the second line is such as shown by VID22 in FIG. 4B, the second line image data is translated into binary signal D as shown in FIG. 4B. If consecutively aligned pixels in the preceding line are all judged to be white and the corresponding columnar pixels in the present line are judged to be black due to the raise of the threshold value as in the region E shown in FIG. 4B, it is the case where a fine vertical line is being read. If, on the other hand, consecutively aligned pixels in the preceding line are all judged to be black and the corresponding columnar pixels in the present line are judged to be white due to the lowering of the threshold value (normal resolution mode) as in the region F, it is the case where a white fine vertical line exists in black background.

Figure 5:
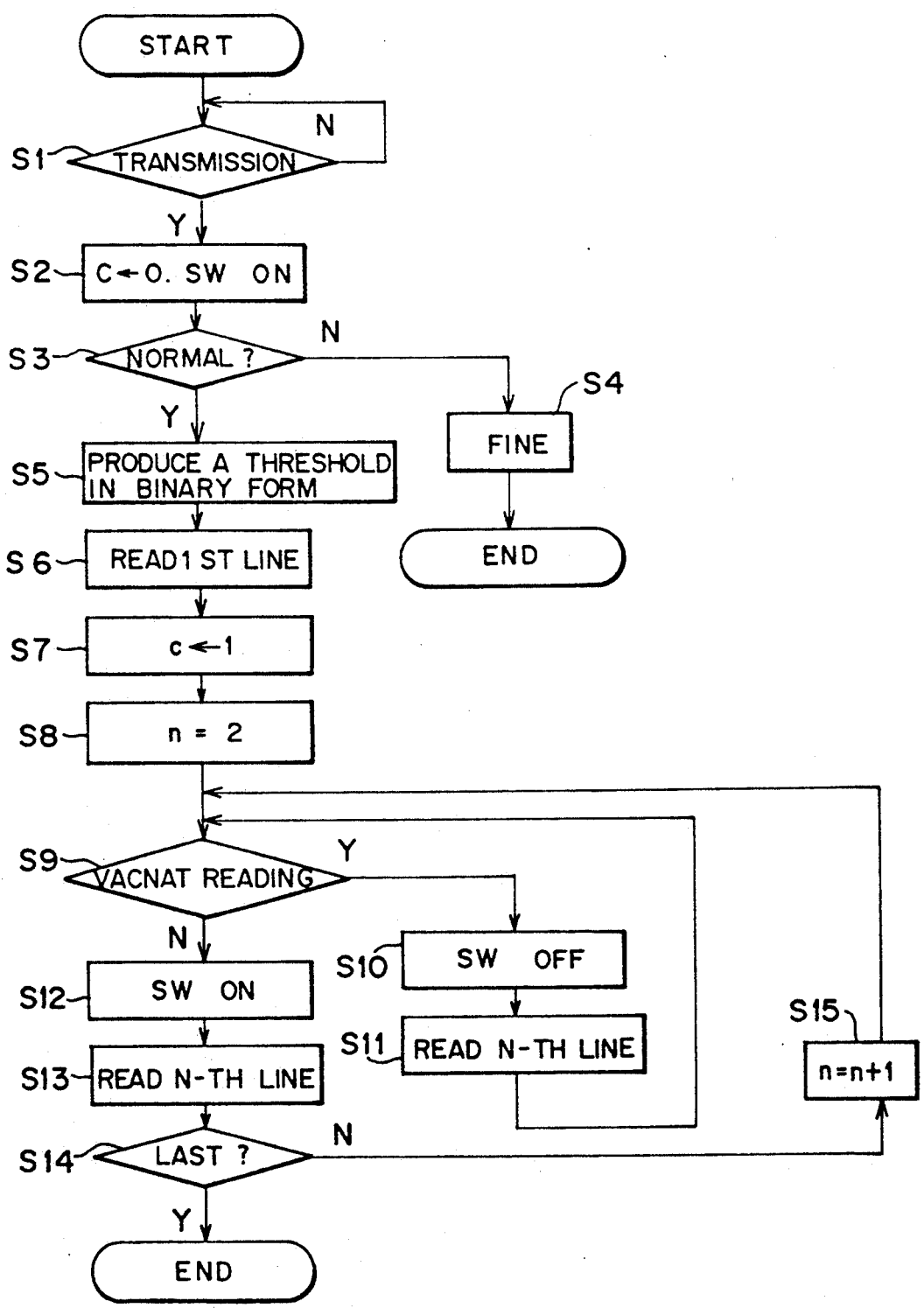
FIG. 5 is a flow chart for description of scanning sequence according to the first embodiment of the present invention.

Operational sequence of the above-described embodiment will next be described with reference to a flow chart shown in FIG. 5.

In step 1, decision is firstly made as to whether or not the facsimile machine is placed in a communication mode. If yes and a document is being read, the signal c to be applied to the threshold controller 7 is set to "0" and the switch 9 is rendered ON (step 2). Next, detection is made as to whether the facsimile machine is in normal or fine resolution mode (step 3). If fine mode, the document is read in the fine mode (step 4) and the reading of the document is terminated. When the facsimile machine is in the normal mode, 8-bit threshold data is sent to the threshold controller 7 from the reading circuit 2 (step 5). The data in this instance represents the level of ST20, since the signal c is at "0" and hence the output of the D/A converter 6 is not subjected to voltage division. The first line of the document is read on the basis of this threshold value (step 6) and is digitized in the comparator 8. As the first line is read, VID 22 is outputted, the binary image signal d is outputted from the comparator 8 and is stored in the shift register of the thermal head 5. Next, the signal c is set to "1" (step 7) to place the threshold controller 7 in a threshold value controllable condition.

Next, the line number n is set to "2" (step 8) to thereby read the second line. At this time, decision is made as to whether the vacant reading is being performed (step 9). If it is the case, the switch 9 is opened (step 10), so that the data held in the shift register of the thermal head 5 is not destroyed by the present reading operation (step 11). If it is not the vacant reading or the vacant reading has been terminated, the switch 9 is closed (step 12) and the reading of the second line is carried out (step 13). At the time of reading the second line, the threshold value B2 is set to either ST20 or NT21 based on the binary image signal D of the first line which is obtained from the shift register of the thermal head 5. The higher level ST20 is selected as the threshold value B2 if the reading of the preceding line indicates white whereas a lower level NT21 is selected as the threshold value B2 if the reading of the preceding line indicates black. After reading of the second line, decision is made as to whether the line being read out is the final line (step 14). If not, "n" is incremented by one (+1) (step 15), and then the subsequent line reading is performed. In this manner, the operational sequence is finished when reading of all the lines are terminated.

Next, referring to FIGS. 6A through 6D, the results of image reproduction will be compared between the present invention and a prior art. With respect to a document shown in FIG. 6A, FIG. 6B shows the results of reproduction according to a prior art wherein the document is read at a normal sensitivity and FIG. 6C also shows the results of reproduction according to the prior art wherein the document is read at an increased sensitivity. FIG. 6D shows the results of reproduction according to the present invention. In FIG. 6B, the horizontal fine line in the second line and the horizontal fines lines existing between the second and third lines and between the fourth and fifth lines cannot be reproduced. In the prior art increased sensitivity mode shown in FIG. 6C, the horizontal fine lines existing between the second and third lines and the white zone between the horizontal fine lines in between the fourth and fifth lines are united to thus yield black region. In contrast, according to the present invention, with the operations described in conjunction with the waveform diagrams and flow chart, the horizontal fine lines between the second and third lines and between the fourth and fifth lines are judged in such a manner that if, for example, the second line is judged to be black, the threshold value for the third line is lowered so that the third line is judged to be white and in turn the fourth line is judged to be black due to the raise of the threshold line. In this manner, the horizontal fine lines can be reproduced with high fidelity.

As described, according to the first embodiment of the invention, the threshold value for the present reading line is changed depending upon the preceding line data, white or black. For example, if the preceding line data is judged to be black, the present line data will not be judged to be black even if it is slightly blackish. On the other hand, if the preceding line is judged to be white, a normal threshold value is used for reading the present line, so that the range of the present line that is judged to be white is narrowed and thus a slightly blackish image is judged to be black. Accordingly, in the case where a horizontal fine line is present in between the second and third lines, if the first line is judged to be white, the second and third lines are judged to be black and white, respectively, whereby a horizontal line is reproduced in the second line. As such, the fine lines extending in the main scanning direction can be reproduced with excellent fidelity without degrading the resolution. Hence, it is not necessary that the sensitivity be uniformly increased or the resolution mode be changed to "fine". As a result, details of the original image will not be lost when reproduced which may otherwise be caused by the lowering of the resolution. Further, it does not take long time to pick up the image.

Moreover, the thermal head including a shift register is used not only for the image reproduction but also for fetching the preceding line data, the facsimile machine is not costly in comparison with those provided with a special purpose memory.

A second embodiment of the present invention will be described with reference to FIG. 7.

Similar to the first embodiment, the scanner device includes a microcomputer (CPU) 21, a reading controller 22 and an image sensor (CIS) 23. Other than those components, the scanner device of the second embodiment includes two threshold value producing circuits 24, 25 which produce two different threshold values A, B, respectively, and two comparators 26, 27 provided in association with the circuits 24, 25, respectively. The comparator 26 has one input terminal connected to the circuit 24 for receiving the threshold value A therefrom and another input terminal connected to the image sensor 23 for receiving the analog image data therefrom. Like the comparator 26, another comparator 27 also has one input terminal connected to the circuit 25 for receiving the threshold value B therefrom and another input terminal connected to the image sensor 23 for receiving the analog image data therefrom. Both the comparators 26, 27 compare the level of the analog image data with their own threshold values and translate the analog image data into binary format. The scanner device further includes a processing circuit 28 for determining whether the output of the image sensor 23 falls within an intermediate range between the threshold values A, B, a shift register 29 for storing one line data outputted from the processing circuit 28, and a selection circuit 30 for selecting either one of the outputs from the comparators 26, 27 depending upon the binary signal representative of the preceding line data.

Figure 7:
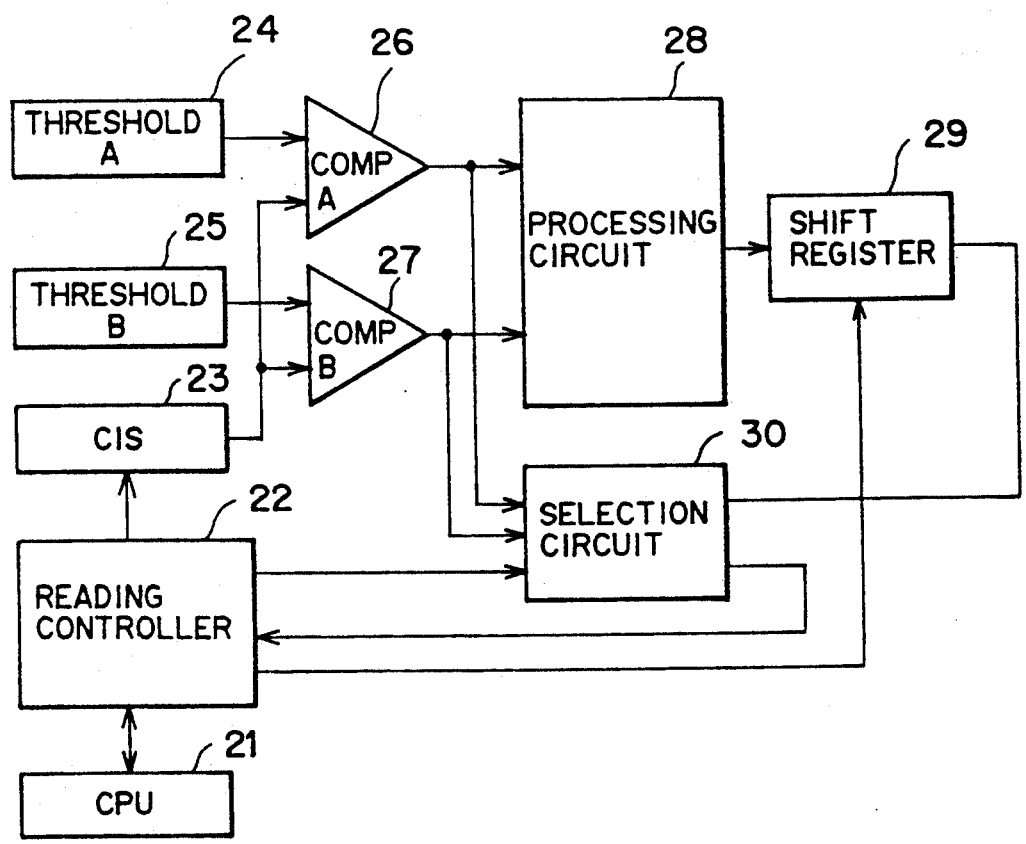
FIG. 7 is a block diagram showing a scanner device according to a second embodiment of the present invention.

Like in the first embodiment, the image data is sent to a network control unit (NCU) through a buffer and a modem and transmitted to another facsimile machine via a telephone line, although not shown in FIG. 7. In the reception mode, the reception data is inputted through the modem to the CPU 21.

In the arrangement shown in FIG. 7, two output signals outputted from the comparators 26, 27 are applied to the processing circuit 28 where detection is made as to whether or not the level of the analog image data falls within an intermediate range between the threshold values A and B. The processing circuit 28 outputs "1" when the level of the analog image data is within the intermediate range whereas it outputs "0" when the analog image data is out of the intermediate range. Hereinafter, the outputs supplied from the processing circuit 28 will be referred to as intermediate data. The intermediate data are sequentially inputted to the shift register 29 and one line data is stored therein. On the other hand, the binary signals outputted from the comparators 26, 27 are applied to the selection circuit 30 where decision is made as to which binary signal is to be selected depending upon the intermediate data regarding the preceding line which data is obtained from the shift register 29. The output from the selection circuit 30 is inputted to the reading controller 22. In the transmission mode, the binary signal is further applied to the CPU 21 from the reading controller 22 and is coded to a proper format for transmission.

Figure 8:
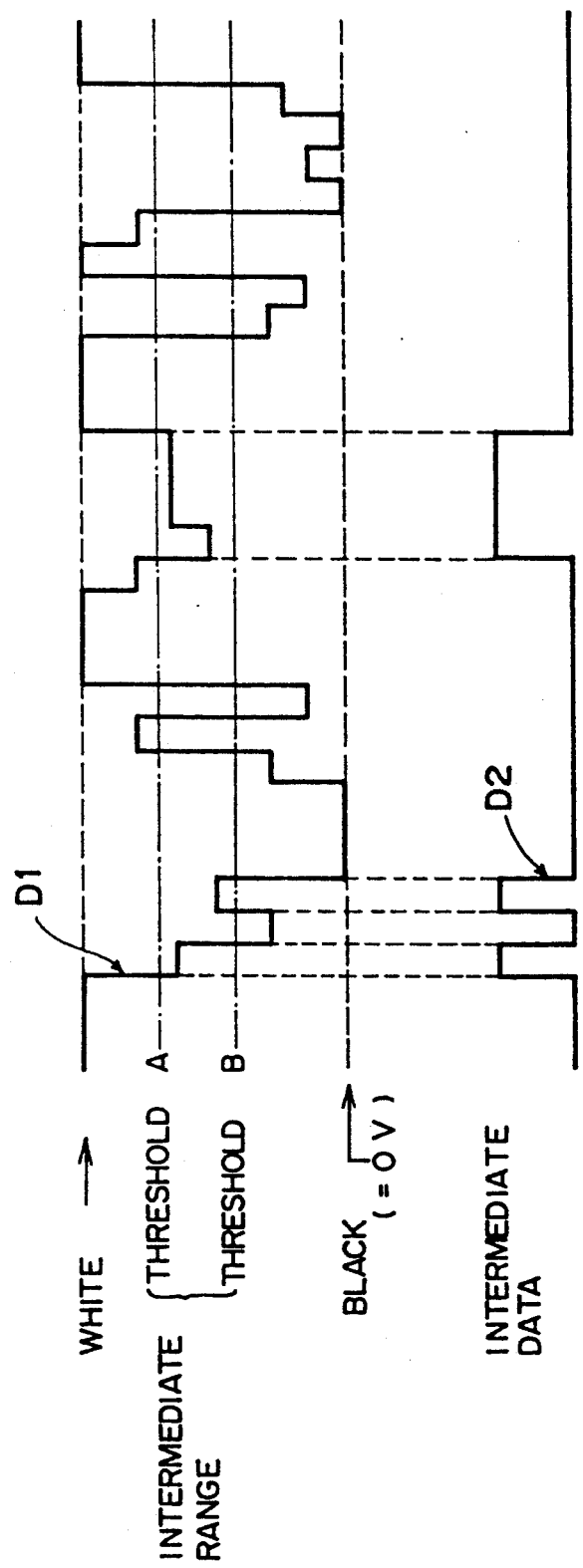
FIG. 8 is a waveform diagram for description of reading operations of the scanner device according to the second embodiment of the present invention.

FIG. 8 is a diagram for description of the operation of the second embodiment, in which drawn is one line image data picked up by scanning a document in the main scanning direction. D1 represents an analog image signal supplied from the image sensor 23. As previously mentioned, a range between the threshold values A and B is defined as the intermediate range. Black level (=0 volt) is lower in level than the threshold value B and white level is above the threshold value A. D2 represents the intermediate data which is "1" when the sensor output D1 is in between the threshold values A and B.

Figure 9:
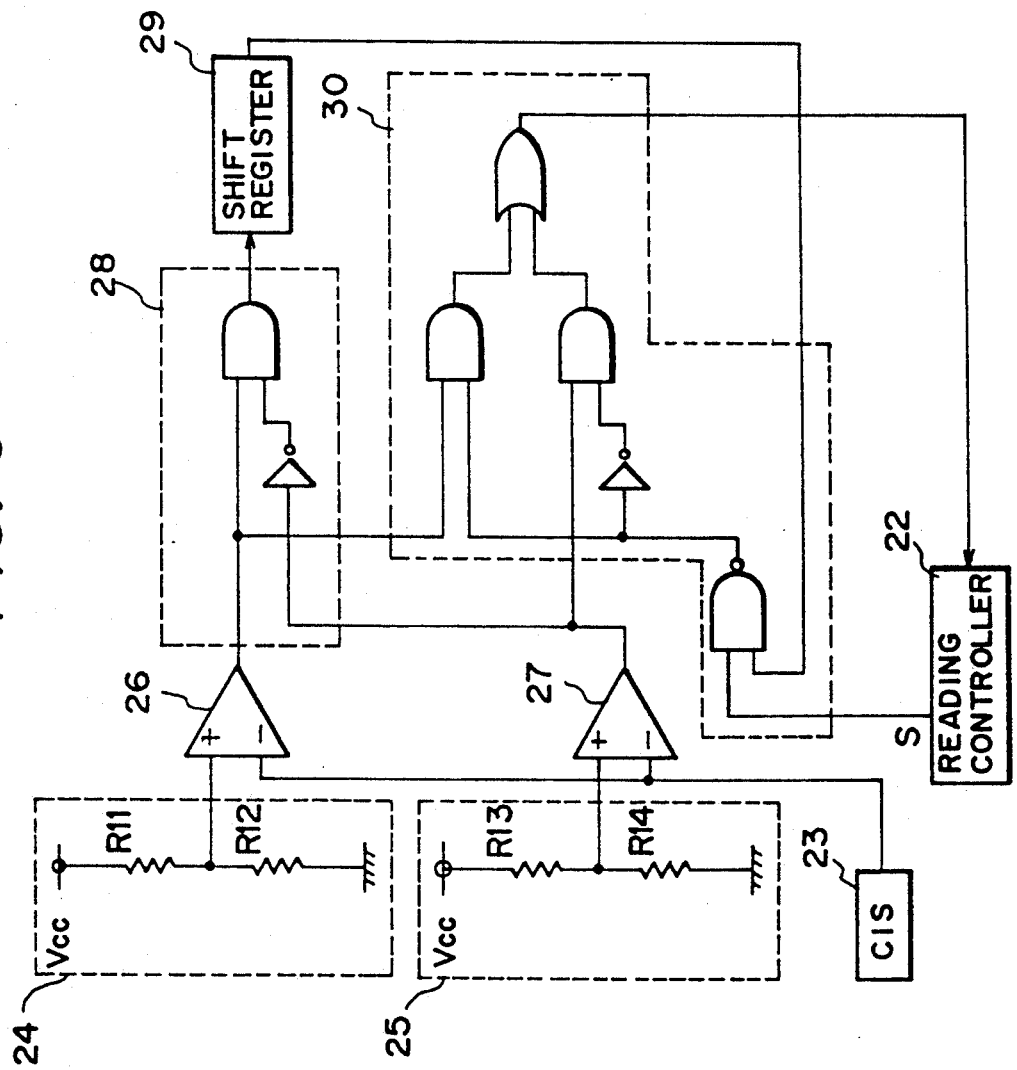
FIG. 9 is a circuit diagram showing a processing circuit and a selection circuit both incorporated into the scanner device according to the second embodiment.

FIG. 9 exemplifies a circuit diagram including the threshold value producing circuits 24, 25, the comparators 26, 27, the processing circuit 28, the selection circuit 30, and the shift register 29. The threshold values A, B are determined by the power supply voltage Vcc divided the resistors R11, R12 and resistors R13, R14, respectively. The threshold value A is applied to the non-inverting input terminal of the comparator 26 and the output signal from the image sensor 23 is applied to the inverting input terminal thereof, wherein the analog image data is translated into a binary format (white* 0, black: 1). Likewise, the threshold value B is applied to the non-inverting input terminal of the comparator 27 and the output signal from the image sensor 23 is applied to the inverting input terminal thereof.

In the processing circuit 28, the intermediate data is produced based on the binary signals supplied from the comparators 26, 27. At this time, as shown in FIG. 8, since the level of the threshold value A is higher than that of the threshold value B, the output from the processing circuit 28 indicates "1" when the level of the analog image signal is within the intermediate range whereas it indicates "0" when the level of the analog image signal is out of the intermediate range. The outputs from the processing circuit 28 are sequentially applied to the shift register 29 and upon one line data being shifted therein, the same is applied to the selection circuit 30. The selection circuit 30 selects either one of the outputs from the comparators 26, 27 depending upon the signal from the shift register 29. When the output of the shift register 29 is "0", the output from the comparator 26 is selected whereas when the output of the shift register 29 is "1", the output from the comparator 27 is selected, whereby when the preceding line data is not within the intermediate range, the threshold value increases. Accordingly, failure in reading the horizontal fine line can be obviated.

By setting the signal S fed from the reading controller 22 to "0", binary image data can be obtained independently of the output from the shift register 29, wherein a single threshold value which is in this instance the threshold value B is used as is done conventionally. When reading the first line, the signal from the shift register 29 is not available. Hence, the signal S is set to "0", thereby enabling to fix the threshold value.

Figure 10:
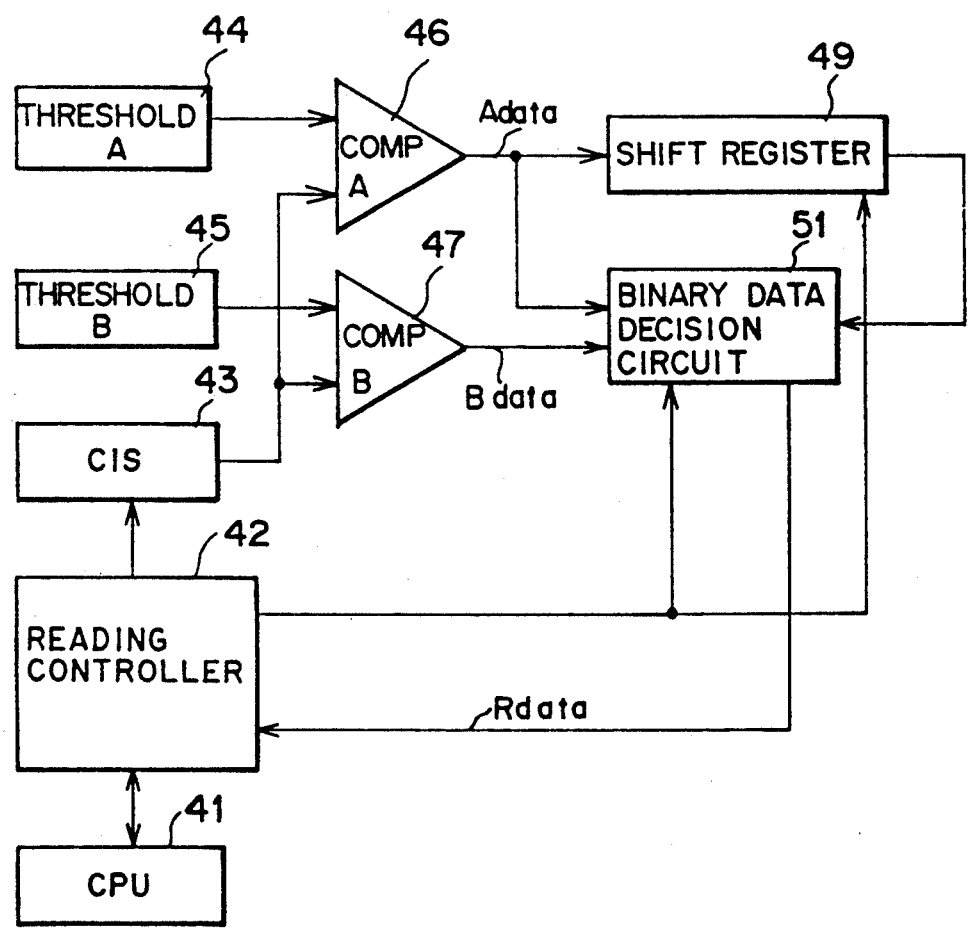
FIG. 10 is a block diagram showing a scanner device according to a third embodiment of the present invention.

Next, the third embodiment of the present invention will be described with reference to FIGS. 10 through 12. The third embodiment is similar to the second embodiment in that two comparators 46, 47 are provided which have different threshold values A, B from each other, as shown in FIG. 10. The third embodiment includes a shift register 49 in which stored is one line image data outputted from the comparator 46 whose threshold value A is larger than another threshold value B, and a binary data decision circuit 51.

The level of the analog image data outputted from the image sensor 43 is compared with the threshold values A, B in the comparators 46, 47 respectively. The threshold value A is set to be higher than the level of the analog image data representative of a horizontal fine line. Hereinafter, the analog image data picked up by the image sensor 43 will be referred to as Vid. The threshold level B corresponds to the level set in a conventional normal resolution mode. The binary signal from the comparator 46 (hereinafter referred to as "Adata") and the binary signal from the comparator 47 (hereinafter referred to as "Bdata") are applied to the binary data decision circuit 51, wherein when Vid>A, Adata=0, when Vid<A, Adata=1, when Vid>B, Bdata=0, and when Vid<B, Bdata=1.

On the other hand, Adata is further inputted to the shift register 29 in which the Adata is shifted by a number subtracting one from a total number of dots on a line. When the n-th dot of the m-th line is being read out, Adata of the (n+1)th dot of the (m−1)th line is obtained from the shift register 49. In the binary data decision circuit 51, the binary data (black and white) of the present line (hereinafter this data will be referred to as "Rdata") is determined on the basis of Adata, Bdata and the Adata of the preceding line fed from the shift register 49. Rdata is applied to the CPU 41 through the reading controller 42.

Figure 11:
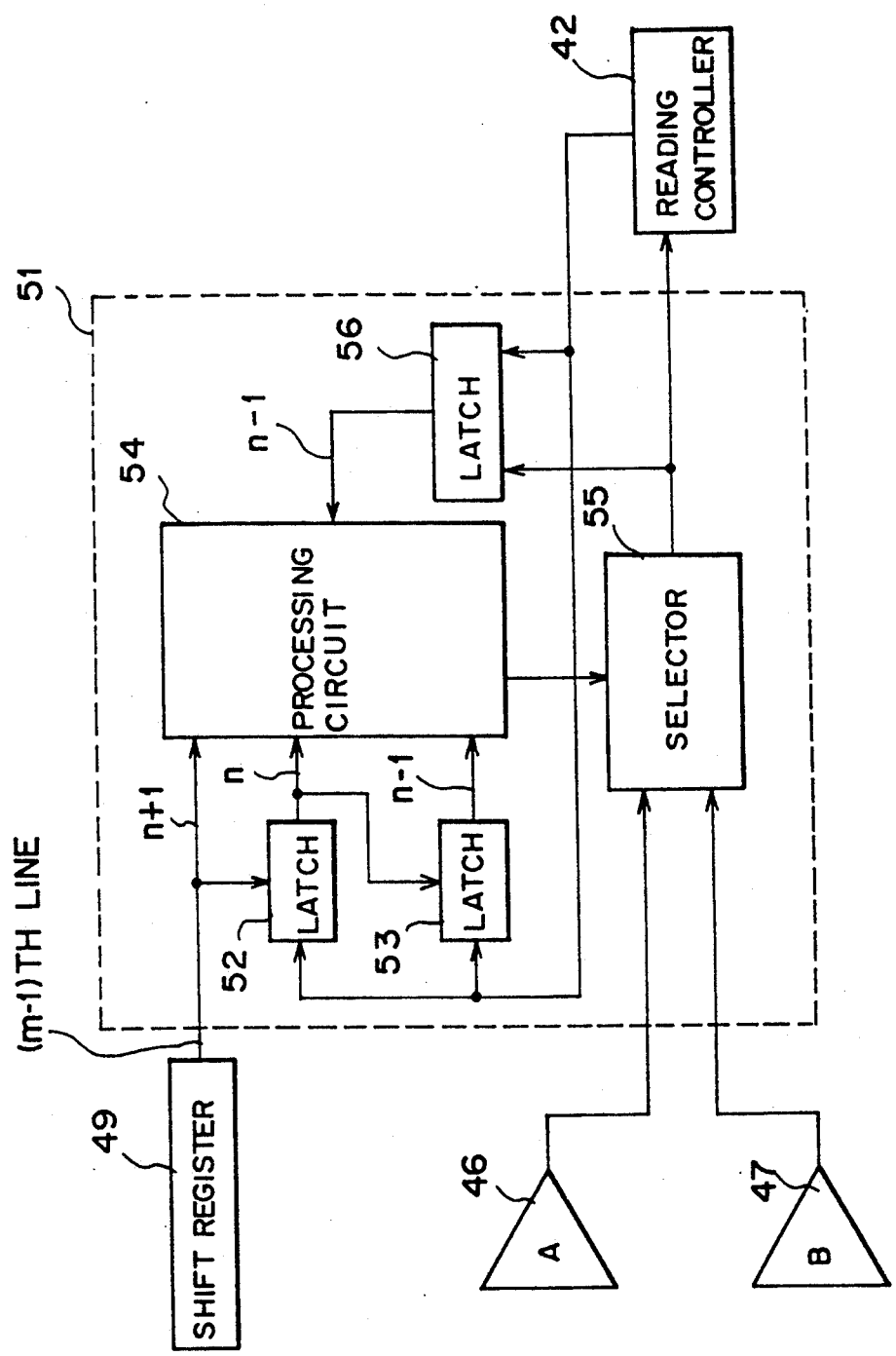
FIG. 11 is a block diagram showing a binary data decision circuit incorporated into the scanner device according to the third embodiment of the present invention.

FIG. 11 is a specific example of the binary data decision circuit 51. Adata of the preceding line fed from the shift register 49 is shifted by one dot in the latch circuit 52 and is further shifted by further one dot in the latch circuit 53. Accordingly, at the time of reading the n-th dot of the m-th line, the outputs from the shift register 49, the latch circuits 52, 53 correspond respectively to Adata of the (n+1)th dot, the n-th dot, and the (n−1)th dot of the (m−1)th line. Rdata is shifted by one dot in the latch circuit 56. Specifically, at the time of reading the m-th line n-th dot, the output from the latch circuit 56 corresponds to Rdata of the m-th line (n−1)th dot. The processing circuit 54 performs processing based on the four output signals fed from the shift register 49 and the latch circuits 52, 53, 56, and determines a select signal to be applied to the selector 55. In the selector 35, either the output from the comparator 46 or the output from the comparator 47 is selected in response to the select signal and Rdata is outputted therefrom. In this manner, reading of the present line is implemented while referring to both data of the preceding line and data of one preceding dot on the present line with respect to the dot subjected to reading.

Figure 12:
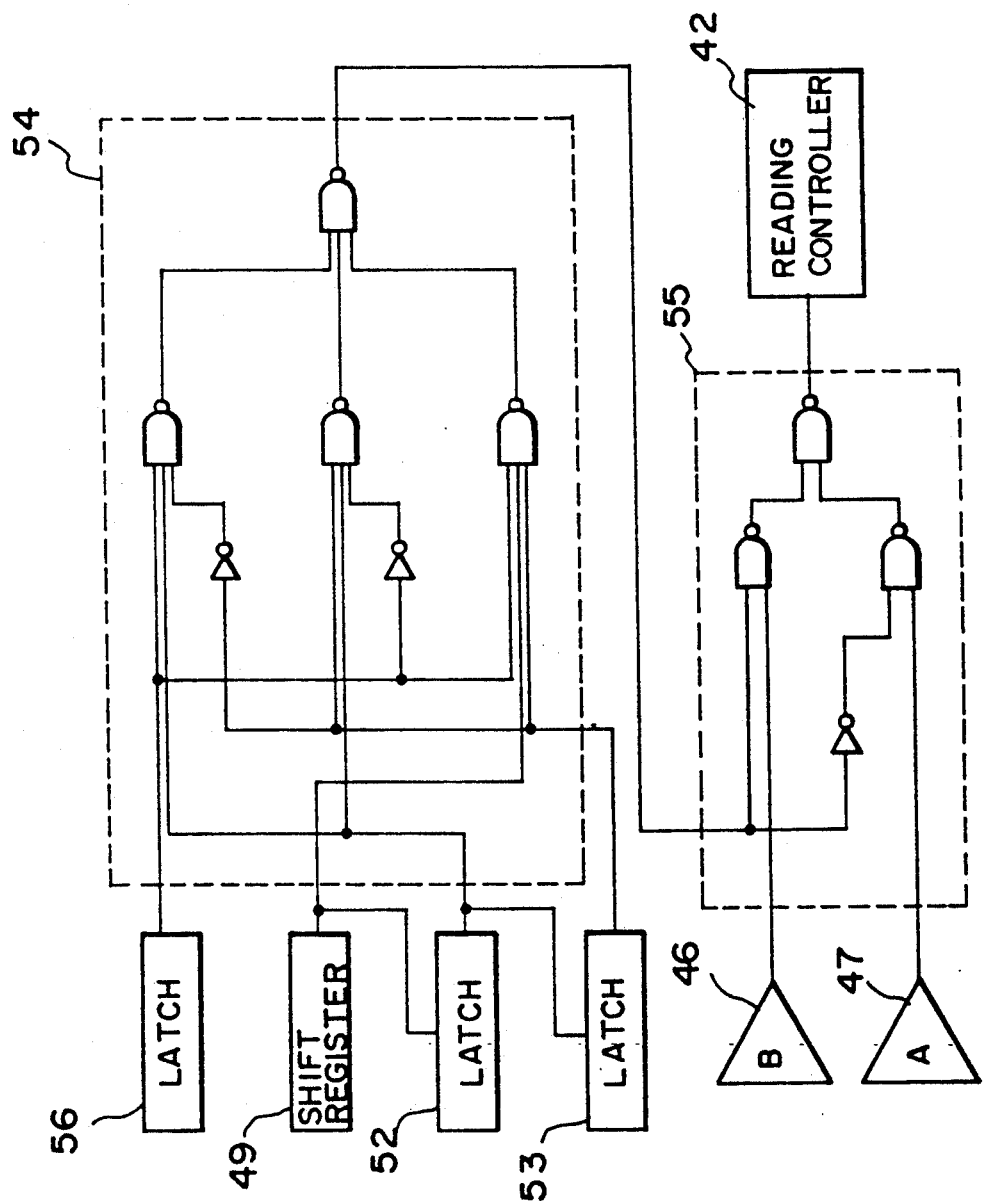
FIG. 12 is a circuit diagram showing a processing circuit and a selection circuit both incorporated into the block diagram shown in FIG. 11.
Figure 13:
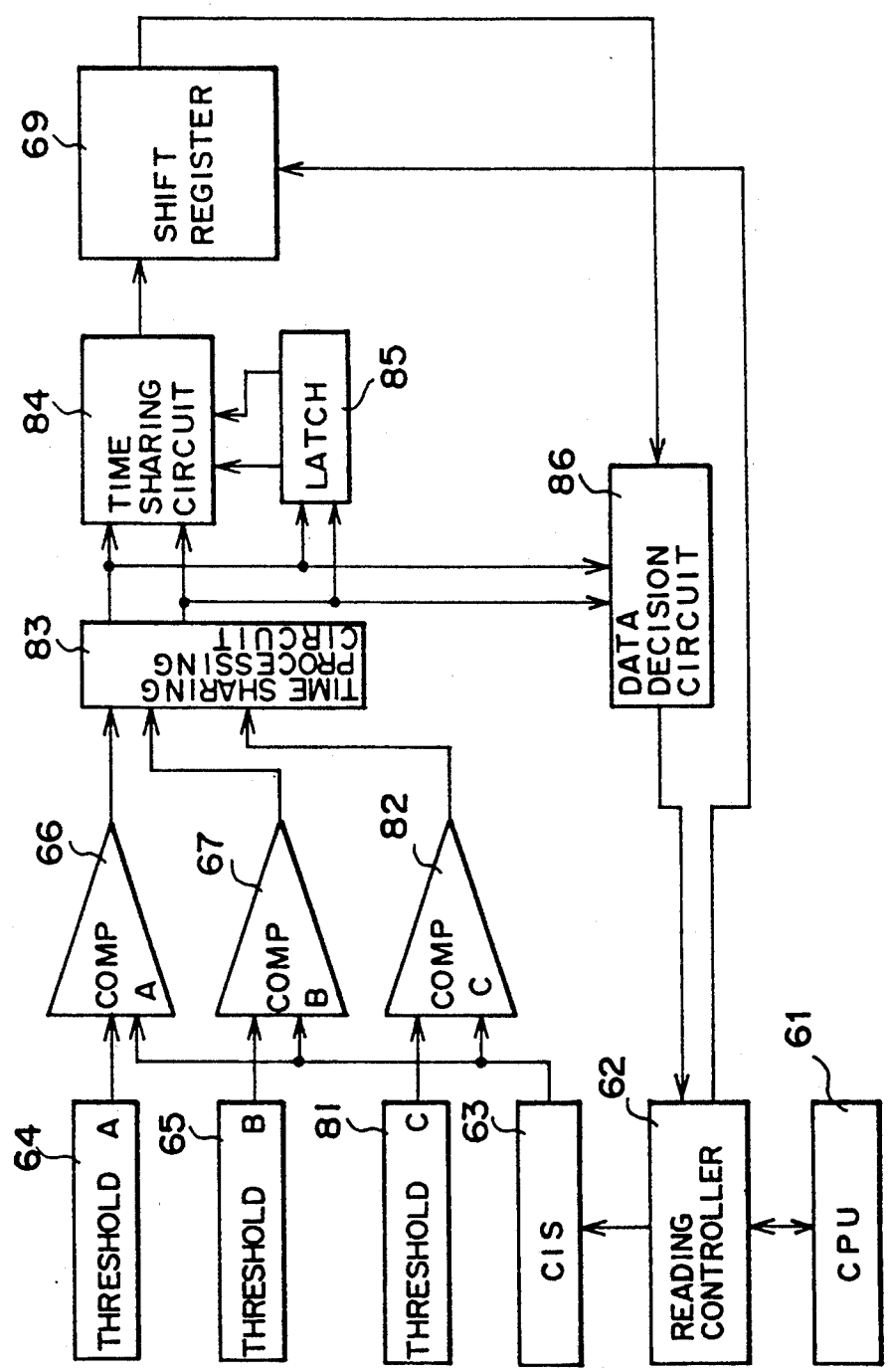
FIG. 13 is a block diagram showing a scanner device according to a fourth embodiment of the present invention.

FIG. 12 shows a circuit diagram showing a specific example of the processing circuit 54 and the selector 55.

A fourth embodiment of the present invention will be described with reference to FIGS. 13 through 16. In the fourth embodiment, there are provided three comparators 66, 67, 82 imposing three threshold values A, B, C different from one another. There are further provided a level discrimination circuit 83, a time sharing/processing circuit 84, a latch circuit 85, a data decision circuit 86, and a shift register 69.

In the arrangement shown in FIG. 12, the analog image data picked up by the image sensor 63 is applied to the comparators 66, 67, 82 where the level of the analog image data is compared with the threshold values A, B, and C which are respectively produced from the threshold value producing circuits 64, 65, 81. In the comparators 66, 67, 82, the analog image data is translated into a binary format. The threshold values A, B, C are in such a relation that A>B>C where the level B corresponds to a threshold value in the normal resolution mode in a conventional facsimile machine. The outputs from the comparators 66, 67, 82 indicate "0" when the level of the analog image data is greater than the respective threshold values A, B, C whereas they indicate "1" when the level of the analog image data is smaller than the respective threshold values.

The level discrimination circuit 83 discriminates the level of the analog image data Vid relative to the outputs from the comparators 66, 67, 82. Specifically, the circuit 83 identifies one of the following four relations:
(1) Vid>A
(2) A>Vid>B
(3) B>Vid>C
(4) C>Vid The results of the identification are represented with 2 bits and are sent to the time sharing/processing circuit 84, the latch circuit 85, and the data decision circuit 86. In the latch circuit 85, the output from the level discrimination circuit 83 (hereinafter referred to as "Rdata") is delayed by one dot or pixel and then outputted to the time sharing/processing circuit 84.

In the time sharing/processing circuit 84, the results of the image sensor 63 reading two consecutive pixels are classified into 4 levels based on Rdata and the output from the latch circuit 85 (hereinafter referred to as "Ldata"), which levels are represented with 2 bits. The results of the processings are shown in FIGS. 14 and 15. The processing results are subjected to time sharing and the resultant data are sent to the shift register 69, wherein the data are shifted by a number corresponding to a total dot number of one line minus two dots. In the data decision circuit 86, the binary image data is determined based on Rdata depending upon data of the preceding line fed from the shift register 69. How this decision is made is illustrated in FIG. 16. The binary image data which has been determined are read by the CPU 61 through the reading controller 62. In this manner, the density of one pixel is represented with one bit and the image data of the present line is determined while referring to the density data of the preceding line. Accordingly, failure in ignoring the horizontal fine lines can be reduced.

What is claimed is:

1. A scanner device for reading a document wherein the document is read on line basis and a line of the document is read on pixel basis while irradiating a light onto the document, comprising:

an image sensor for reading an image on a document, said image sensor receiving a light reflected from the document and converting the light received therefrom to an analog electric signal;

a first comparator for translating the analog electric signal into a binary signal, said first comparator having a first input terminal to which the analog electric signal is applied, a second input terminal to which a first threshold value is applied, and an output terminal, said first comparator outputting a first binary signal upon comparing the analog electric signal with the first threshold value;

a second comparator for translating the analog electric signal into a binary signal, said second comparator having a first input terminal to which the analog electric signal is applied, a second input terminal to which a second threshold value is applied, and an output terminal, the first threshold value being larger than the second threshold value, said second comparator outputting a second binary signal upon comparing the analog electric signal with the second threshold value;

processing means having two input terminals connected respectively to the output terminals of said first and second comparators, said processing means processing the first and second binary signals to detect whether the analog electrical signal outputted from said image sensor has a level falling within a range between the first and second threshold values and outputting detection data;

storage means for storing the detection data regarding a preceding line with respect to a present line which is presently read by said image sensor; and selection means receiving the first and second binary signals from said first and second comparators, said selection means selecting either one of the first and second binary signals in response to the detection data supplied from said storage means.

2. A scanner device for reading a document wherein the document is read on a line basis and a line of the document is read on pixel basis while irradiating a light onto the document, said scanner device comprising:

an image sensor for reading an image on a document, said image sensor receiving light reflected from the document and converting the light received therefrom to an analog electric signal;

a first comparator for translating the analog electric signal into a binary signal, said first comparator having a first input terminal to which the analog electric signal is applied, a second input terminal to which a first threshold value is applied, and an output terminal, said first comparator outputting a first binary signal upon comparing the analog electric signal with the first threshold value;

a second comparator for translating the analog electric signal into a binary signal, said second comparator having a first input terminal to which the analog electric signal is applied, a second input terminal to which a second threshold value is applied, and an output terminal, the first threshold value being larger than the second threshold value, said second comparator outputting a second binary signal upon comparing the analog electric signal with the second threshold value;

first storage means for storing the first binary signal outputted from said first comparator when said image sensor is reading an n-th dot of the image on an m-th line of the document, said first storage means comprising first outputting means for outputting a first reference signal representative of an (n+1)th dot of the image on an (m−1)th line of the document, second outputting means for outputting a second reference signal representative of an n-th dot of the image on the (m−1)th line of the document, and a third outputting means for outputting a third reference signal representative of an (n−1)th dot of the image on the (m−1)th line of the document;

selection means for receiving the first and second binary signals from said first and second comparators and selecting and outputting one of the first and second binary signals in response to a selection signal;

second storage means for storing the binary signal selected by said selection means and outputting a fourth reference signal representative of an (n−1)th dot of the image on the m-th line; and processing means for producing the selection signal based on the first, second, third and fourth reference signals, said first, second, third and fourth reference signals being supplied to said processing means for processing by said processing means.

3. The scanner device of claim 2, wherein said first outputting means comprises a shift register having an input terminal to receive the first binary signal on dot basis from said first comparator, said shift register having an output terminal connected to said processing means to sequentially output the first binary signal upon shifting the received first binary signal by a number corresponding to a total number of possible dots existing in one line minus one dot.

4. The scanner device of claim 3, wherein said second outputting means comprises a first latch circuit having an input terminal connected to the output terminal of said shift register to receive and store the first binary signal outputted from said shift register, said first latch circuit having an output terminal connected to said processing means to output the stored first binary signal when the first binary representative of a subsequent dot is received at the input terminal of said first latch circuit.

5. The scanner device of claim 4, wherein said third outputting means comprises a second latch circuit having an input terminal connected to the output terminal of said first latch circuit to receive and store the first binary signal outputted from said first latch circuit, said second latch circuit having an output terminal connected to said processing means to output the stored first binary signal when the first binary signal representative of a subsequent dot is received at the input terminal of said second latch circuit.

6. The scanner device of claim 5, wherein said second storage means comprises a third latch circuit having an input terminal connected to the output terminal of said selection means to receive and store the selected binary signal on dot basis, said third latch circuit having an output terminal connected to said processing means to output the stored binary signal when the binary signal representative of a subsequent dot is received at the input terminal of said third latch circuit.

* * * * *